(12) United States Patent
Mulhern

(10) Patent No.: US 12,145,403 B2
(45) Date of Patent: *Nov. 19, 2024

(54) FLUTTER RESISTANT CASTER

(71) Applicant: Pride Mobility Products Corporation, Duryea, PA (US)

(72) Inventor: James Mulhern, Nanticoke, PA (US)

(73) Assignee: PRIDE MOBILITY PRODUCTS CORPORATION, Duryea, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,830

(22) Filed: Jun. 7, 2023

(65) Prior Publication Data
US 2023/0322023 A1    Oct. 12, 2023

Related U.S. Application Data

(63) Continuation of application No. 17/110,582, filed on Dec. 3, 2020, now Pat. No. 11,707,946.

(51) Int. Cl.
| | |
|---|---|
| *B60B 33/02* | (2006.01) |
| *A61G 5/04* | (2013.01) |
| *F16C 19/38* | (2006.01) |

(52) U.S. Cl.
CPC ............. *B60B 33/023* (2013.01); *A61G 5/04* (2013.01); *F16C 19/383* (2013.01)

(58) Field of Classification Search
CPC .............. B60B 33/023; B60B 33/028; B60B 2900/131; B60B 33/0068; B60B 33/045; A61G 5/04; F16C 19/383; F16C 2316/10; F16C 19/305; F16C 19/381; F16C 19/463; F16C 35/063; F16C 41/001
See application file for complete search history.

(56) References Cited

U.S. PATENT DOCUMENTS

| | | | |
|---|---|---|---|
| 4,432,116 A | 2/1984 | Schultz | |
| 4,969,232 A | 11/1990 | Michel | |
| 4,989,920 A | 2/1991 | Kauzlarich et al. | |
| 5,503,416 A * | 4/1996 | Aoki | B60B 33/021 378/198 |

(Continued)

FOREIGN PATENT DOCUMENTS

| | | | |
|---|---|---|---|
| DE | 4412603 A1 * | 10/1995 | ......... B60B 33/0039 |
| DE | 20218777 U1 * | 2/2003 | ......... B60B 33/0018 |

(Continued)

*Primary Examiner* — James A Shriver, II
*Assistant Examiner* — Ian Bryce Shelton
(74) *Attorney, Agent, or Firm* — Morgan, Lewis & Bockius LLP

(57) ABSTRACT

A vehicle may include a flutter resistant caster. The vehicle may include a frame, a drive wheel coupled to the frame, a caster housing coupled to the frame, a caster, a locking element, a first bearing, and a biasing element. The caster housing may include an opening. The caster may include a caster wheel and a caster stem extending through the opening in the caster housing. The caster stem may be configured to rotate relative to the caster housing. The locking element may be coupled to the caster stem. The first bearing may be coupled to the caster stem. The biasing element may be coupled to the caster stem. The biasing element may be configured to exert a force on the first bearing.

26 Claims, 4 Drawing Sheets

(56) References Cited

U.S. PATENT DOCUMENTS

| | | | |
|---|---|---|---|
| 5,809,612 A * | 9/1998 | Finch | B60B 33/0073 16/21 |
| 6,584,641 B1 * | 7/2003 | Milbredt | B60B 33/0049 16/35 R |
| 6,588,059 B1 * | 7/2003 | McCord | B60B 33/0049 16/31 R |
| 6,944,910 B2 | 9/2005 | Pauls | |
| 9,126,455 B1 * | 9/2015 | Hsieh | B60B 33/0057 |
| 9,139,044 B1 * | 9/2015 | Tsai | B60B 33/021 |
| 10,092,465 B2 * | 10/2018 | Van de Wal | B60B 33/00 |
| 10,499,554 B2 | 12/2019 | Sudbrink et al. | |
| 11,192,399 B2 * | 12/2021 | Parikh | F16C 33/7886 |
| 11,292,294 B1 * | 4/2022 | Long | B60B 33/0005 |
| 2008/0115324 A1 * | 5/2008 | Block | B60B 33/0021 16/35 R |
| 2011/0120815 A1 * | 5/2011 | Frolik | B60B 33/0081 188/1.12 |
| 2012/0255141 A1 * | 10/2012 | Lin | B60B 33/025 16/45 |
| 2016/0089932 A1 * | 3/2016 | Weis | B60B 33/0078 188/1.12 |
| 2017/0340494 A1 * | 11/2017 | Van de Wal | B60B 33/00 |
| 2019/0093690 A1 * | 3/2019 | Nakayama | B25J 9/046 |
| 2019/0366768 A1 | 12/2019 | Bergman | |
| 2021/0145669 A1 * | 5/2021 | Harrison | B60B 33/045 |

FOREIGN PATENT DOCUMENTS

| | | | | |
|---|---|---|---|---|
| DE | 10256626 A1 * | 6/2004 | | B60B 33/0018 |
| DE | 102017101830 A1 * | 8/2018 | | |
| JP | 61024602 A * | 7/1984 | | |

* cited by examiner

FLUTTER RESISTANT CASTER

BACKGROUND OF THE INVENTION

The present invention generally relates to a caster and, more particularly, to a flutter resistant caster for a vehicle.

BRIEF SUMMARY OF THE INVENTION

A vehicle may include a flutter resistant caster. The vehicle may include a frame, a drive wheel coupled to the frame, a caster housing coupled to the frame, a caster, a locking element, a first bearing, and a biasing element. The caster housing may include an opening. The caster may include a caster wheel and a caster stem extending through the opening in the caster housing. The caster stem may be configured to rotate relative to the caster housing. The locking element may be coupled to the caster stem. The first bearing may be coupled to the caster stem. The biasing element may be coupled to the caster stem.

The biasing element may be positioned between the locking element and the caster housing. The biasing element may be configured to exert a force on the first bearing. The caster stem may include a flange and the biasing element may be positioned between the first bearing and the flange. The biasing element may be positioned between the first bearing and the housing. The biasing element may be one of a plurality of biasing elements.

The biasing element may include one or more coned disc springs. The one or more coned disc springs may include a first coned disc spring and a second coned disc spring. An outer portion of the first coned disc spring may engage an outer portion of the second coned disc spring. An inner portion of the first coned disc spring may engage an inner portion of the second coned disc spring.

The first bearing may include a first race, a second race, and a bearing element between the first race and the second race. At least two of the first race, the second race, and the bearing element may rotate as the caster stem rotates relative to the caster housing. At least one of the first race, the second race, and the bearing element may be rotationally fixed as the caster stem rotates relative to the caster housing. The first bearing may include a thrust bearing. The first bearing may be axially moveable relative to the caster stem.

The caster housing may define a chamber and the locking element and biasing element may be within the chamber. The first bearing may be within the chamber. The caster stem may extend through the opening into the chamber.

In a further embodiment, the vehicle may include a second bearing coupled to the caster stem. The caster housing may include a recess to receive at least a portion of the second bearing and activation of the locking element may move the second bearing into contact with a partition wall defining a portion of the recess. Activation of the locking element may move the second bearing into contact with the partition wall and apply a force to the second bearing to inhibit rotation of the second bearing. The first bearing may be positioned on a first side of the opening in the caster housing and the second bearing may be positioned on a second side of the opening in the caster housing opposite the first side.

In a further embodiment, the vehicle may include a gasket between the second bearing and the caster housing. The second bearing may include a tapered roller bearing. The locking element may prevent movement of the caster stem along a longitudinal axis of the caster stem but allow rotation of the caster stem about the longitudinal axis. The locking element may threadedly engage the caster stem. The locking element may be at least temporarily rotationally fixed relative to the caster stem. The locking element may be transitionable from an unlocked condition to a locked condition, wherein the locking element is rotatable relative to the caster stem in the unlocked condition and is rotationally fixed relative to the caster stem in the locked condition. The locking element may be transitioned from the unlocked condition to the locked condition by applying a torque force of about 1 foot pound to about 100 foot pounds.

In a further embodiment, the vehicle includes a motor coupled to the drive wheel, the motor configured to rotate the drive wheel. In a further embodiment, the vehicle may include a bushing coupled to the caster stem, the bushing extending at least partially into the opening. The vehicle may include a wheelchair. The vehicle may include a single engagement surface between a surface of the first bearing and the caster stem. The first bearing may include a radially disposed bearing element.

BRIEF DESCRIPTION OF THE SEVERAL VIEWS OF THE DRAWINGS

The foregoing summary, as well as the following detailed description of embodiments of the flutter resistant caster, will be better understood when read in conjunction with the appended drawings of an exemplary embodiment. It should be understood, however, that the invention is not limited to the precise arrangements and instrumentalities shown. For example, although not expressly stated herein, features of one or more various disclosed embodiments may be incorporated into other of the disclosed embodiments.

In the drawings.

DETAILED DESCRIPTION OF THE EXEMPLARY EMBODIMENTS OF THE INVENTION

Figure 1:
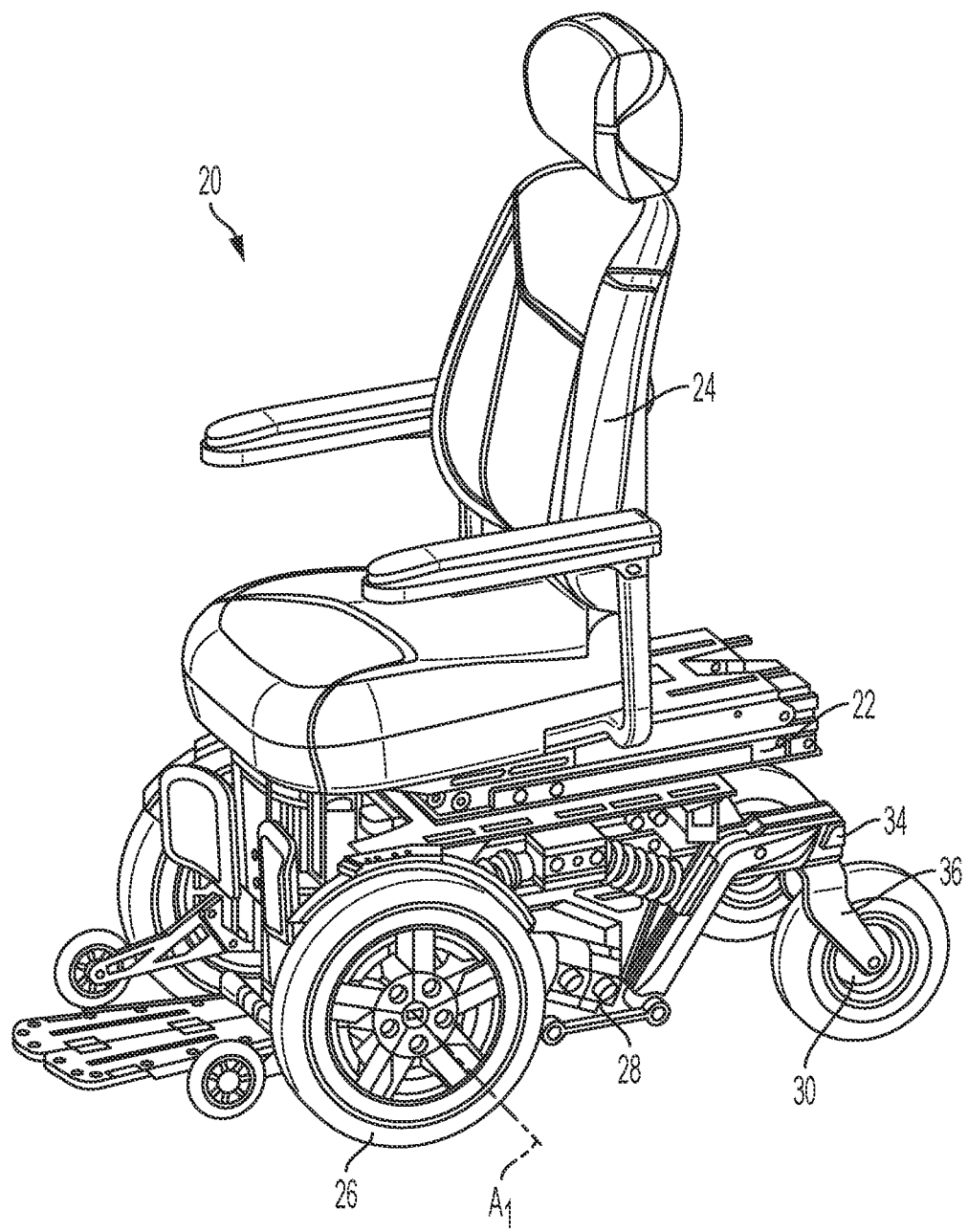
FIG. 1 is a perspective view of a vehicle including a caster assembly in accordance with an exemplary embodiment of the present invention.
Figure 2:
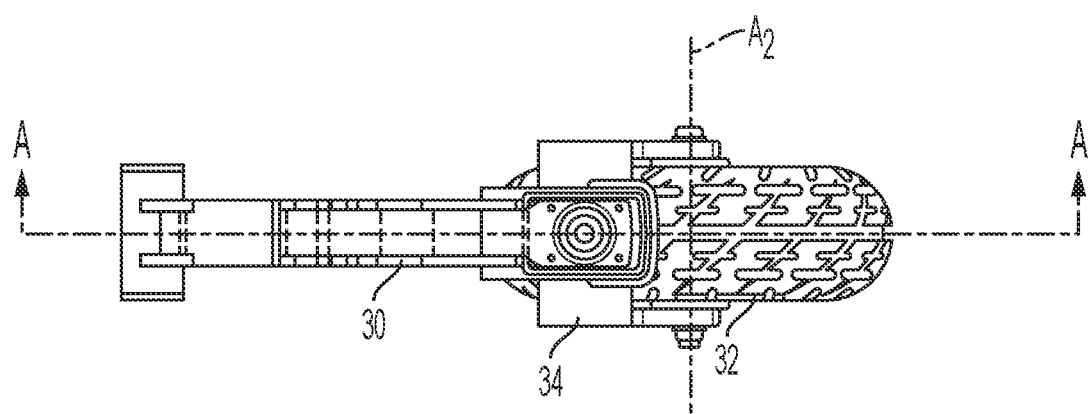
FIG. 2 is a top, isolated view of the caster assembly of FIG. 1.

Most vehicles are moveable in a selected direction. Users prefer vehicles that travel in a desired direction without veering off an intended course. Some vehicles include a drive wheel and a free or follower wheel. The drive wheel may be rotated manually or by a motor to move the vehicle. The follower wheel may provide the vehicle with stability and follow the course set by the drive wheel. Some follower wheels are casters that rotate about a wheel axis and about a caster stem axis. Too much rotation of the caster about the caster stem axis can lead to flutter that slows the vehicle down or causes the vehicle to veer off course. There is a need for vehicles having a follower wheel that resists flutter without inhibiting steering of the vehicle to improve vehicle performance.

Referring to the drawings in detail, wherein like reference numerals indicate like elements throughout, there is shown in FIGS. 1-4 a vehicle, generally designated 20, in accordance with an exemplary embodiment of the present invention.

The vehicle 20 may include a frame 22 or chassis. Other components of the vehicle 20 may be coupled to the frame 22. For example, a receiving area 24 for a user may be coupled to the frame 22. In some embodiments, the receiving area 24 includes a seat, a bench for a user to kneel on, or a surface for a user to sit or lie on. In other embodiments, the receiving area 24 includes an area to receive objects other than a user. In some embodiments, vehicle 20 is a wheelchair. In other embodiments, vehicle 20 is a scooter or cart.

The vehicle 20 may include a drive means to move the vehicle. In some embodiments, the drive means includes a drive wheel 26. Drive wheel 26 may be moveably coupled to frame 22. Drive wheel 26 may be rotatably coupled to frame 22. Drive wheel 26 may rotate about axis $A_1$. Axis $A_1$ may be perpendicular to frame 22. In some embodiments, drive wheel 26 is rotated manually. In other embodiments, a motor 28 rotates drive wheel 26. Motor 28 may selectively rotate drive wheel 26 in a direction (e.g., forward or rearward) to move vehicle 20. Vehicle 20 may include a first drive wheel and a second drive wheel. A first motor may be coupled to first drive wheel and a second motor may be coupled to second drive wheel. First motor and second motor may be independently controlled from one another.

Vehicle 20 may have a drive system including a controller that sends a signal to each of first motor and second motor. The controller may receive a signal from a steering input (e.g., a steering wheel, joystick, sip-n-puff controller). The controller may send a signal to one or both of first motor and second motor in response to receiving the signal from steering input. In some embodiments, drive wheel 26 is a front drive wheel. In other embodiments, drive wheel 26 is a rear drive wheel or mid drive wheel.

It may be desirable for vehicle 20 to include one or more additional wheels or other elements in contact with the ground to stabilize vehicle 20. It may be desirable to include a follower or follower wheel that is not driven by a motor to reduce energy consumption and/or reduce complexity of the drive system. Vehicle may include a caster 30 coupled to frame 22. Caster 30 may be coupled to frame 22 opposite drive wheel 26. In some embodiments, caster 30 is rearward of drive wheel 26. In other embodiments, caster 30 is in front of drive wheel 26. In still yet other embodiments, vehicle 20 includes one or more casters 30 but does not include a drive wheel.

Caster 30 may include a caster wheel 32. Caster wheel 32 may be rotatable about axis $A_2$ (FIG. 2) relative to the frame 22. Axis $A_1$ and axis $A_2$ may be parallel or lie within parallel planes when vehicle 20 is on a generally horizontal surface. Caster 30 may rotate about axis $A_2$ as vehicle moves. Caster 30 may include an axle having a central axis on axis $A_2$. The axle may be coupled to one or more forks 36. Forks 36 may be positioned on opposing sides of caster wheel 32.

Figure 3:
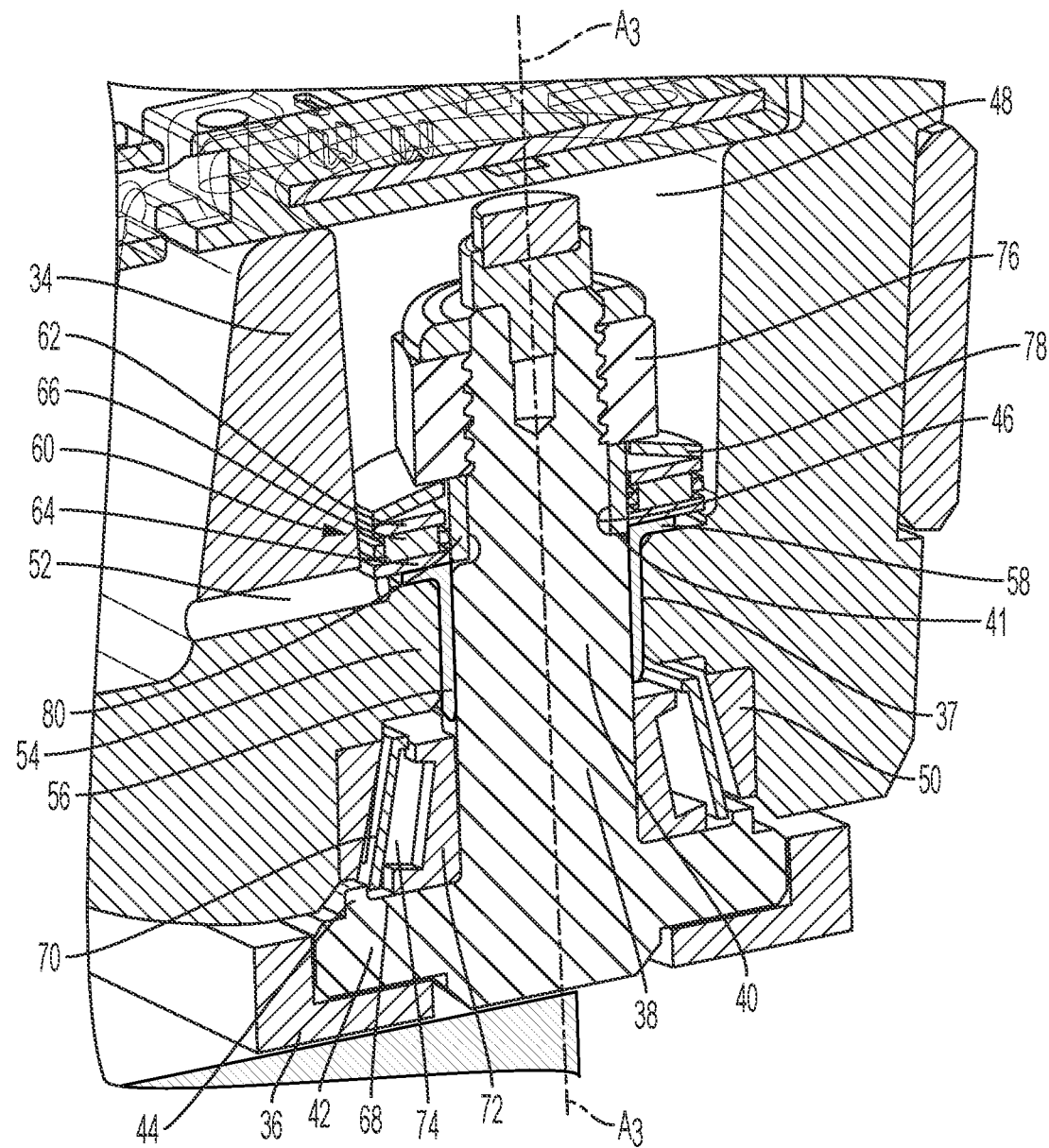
FIG. 3 is an enlarged perspective sectional view of the caster assembly of FIG. 1 taken along a plane, the location and direction being indicated by line A-A in FIG. 2.
Figure 4:
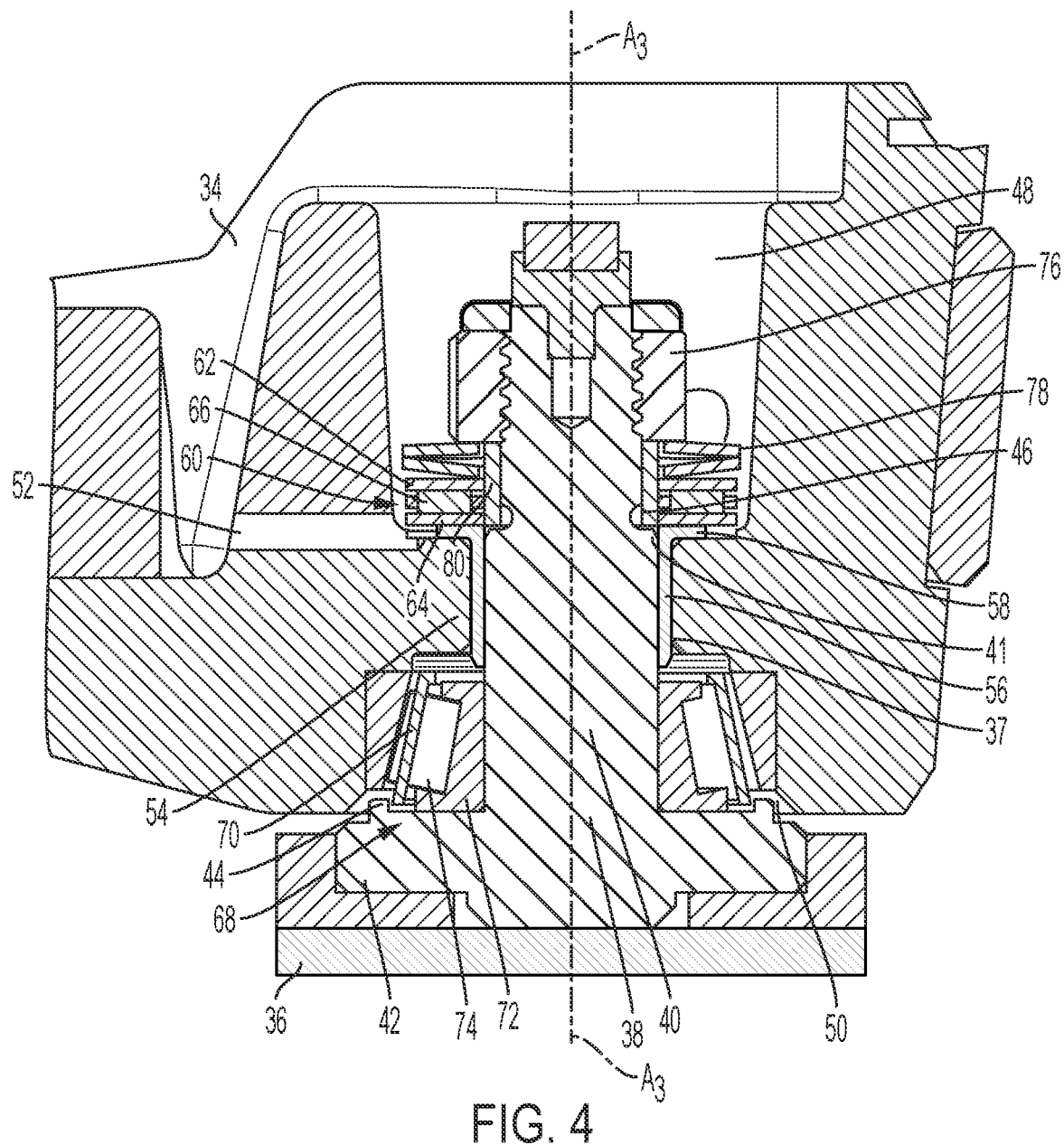
FIG. 4 is an enlarged side elevational sectional view of the caster assembly of FIG. 1 taken along a plane, the location and direction being indicated by line A-A in FIG. 2.

Casters that spin about a second axis as vehicle turns may provide a smoother ride and a tighter turning radius compared to casters that only rotate about one axis. Referring to FIG. 3, caster may rotate or pivot about axis $A_3$ as vehicle turns. Caster 30 may rotate (e.g., independently or simultaneously) about axis $A_2$ and axis $A_3$.

Caster 30 may include a caster housing 34 fixed to frame 22. An upper portion of forks may be adjacent housing 34. In some embodiments, lower surface of housing 34 engages upper surface of forks 36 to transfer at least some of the weight of the vehicle through forks 36 and to caster wheel 32.

Housing 34 may include a first chamber 48 to receive a portion of caster stem 38 and components associated therewith, as explained below. Housing 34 may include a second chamber to receive a portion of caster stem 38 and associated components. First chamber 48 may have a smaller diameter than second chamber 50. First chamber 48 may be defined by a sidewall (e.g., a tapered sidewall). An aperture 52 may extend through the sidewall of the housing 34. Aperture 52 may provide visual access into first chamber 48. A partition wall or shelf 54 may separate first chamber 48 from second chamber 50. Housing 34 may include an opening 37 extending through shelf 54 such that first chamber 48 is in communication with second chamber 50.

Caster 30 may include a caster stem 38. Caster stem 38 may include a body 40 having a longitudinal axis coincident with axis $A_3$. Body 40 may be generally cylindrical. Caster stem 38 may include a flange 42. Flange 42 may extend radially outwardly away from body 40. A ridge 44 may protrude away from a surface (e.g., upper surface) of flange 42. The space between ridge 44 and caster stem 38 may define a receiving area for a bearing, as explained in greater detail below. Caster stem 38 may include a neck 46 having a smaller diameter than body 40. Neck 46 may have a reduced diameter compared to an adjacent portion of caster stem 38. Neck 46 may reduce stress concentration within caster stem 38 at or near ledge 41.

Opening 37 may receive at least a portion of caster stem 38. Caster stem 38 may extend though opening 37 in shelf 54 from first chamber 48 to second chamber 50. Shelf 54 may have a height as measured along the longitudinal axis of caster stem 38. Height of shelf 54 may be selected to ensure that caster stem 38 rotates about axis $A_3$ relative to housing 34 with minimal or no wobbling.

A bushing 56 may be positioned between the caster stem 38 and the shelf 54. At least a portion of bushing 56 may be within opening 37. Bushing 56 may prevent contact between shelf 54 and caster stem 38 as caster stem 38 rotates relative to housing 34. Bushing 56 may be manufactured from a material (e.g., nylon, bronze, plastic) that reduces or minimizes friction between the caster stem 38 or shelf 54 and bushing 56 compared to friction between caster stem 38 and shelf 54.

Bushing 56 may include a height greater than or equal to the height of shelf 54. In some embodiments, an upper surface of bushing 56 is generally at the same height as upper surface of body 40 of caster stem 38. In other embodiments, upper surface of bushing 56 is below upper surface of body 40. In some embodiments, bushing 56 is rotationally fixed (e.g., via press fit, snap fit, fastener, or adhesive) relative to shelf 54. In other embodiments, bushing 56 is rotationally fixed (e.g., via press fit, snap fit, fastener, or adhesive) relative to caster stem 38. Bushing 56 may include a flange 58 extending radially outwardly from an adjacent portion of bushing 56. Flange 58 may have a diameter greater than a diameter of opening 37. Flange 58 may prevent bushing 56 from moving through opening 37. Flange 58 may contact an upper surface of shelf 54.

Caster 30 may include a first bearing 60 that allows rotation of the caster stem 38 relative to housing 34. First bearing 60 may include a central opening to receive a portion of caster stem 38. First bearing 60 may resist lateral and/or axial movement of caster stem 38 (e.g., as caster stem rotates relative to housing). First bearing 60 may include a first race 62 (e.g., upper race), a second race 64, (e.g., lower race), and a bearing element or roller 66 between the first race 62 and second race 64. In some embodiments, first bearing 60 is a thrust bearing or a needle thrust bearing. In other embodiments, first bearing 60 is a race bearing, plain bearing, rolling bearing, slewing bearing, or angularly disposed bearing. First bearing 60 may be a radially disposed bearing element. Second race 64 may be positioned adjacent bushing 56. Second race 64 may contact flange 58 of bushing 56.

First race 62 and second race 64 may define a receiving area for roller 66. Roller 66 may be a ball bearing or cylindrical element that rotates relative to at least one of first race 62 and second race 64. At least one of first race 62, second race 64 and roller 66 may rotate relative to the housing as the caster stem 38 rotates relative to housing 34. At least one of first race 62, second race 64 and roller 66 may be rotationally fixed relative to the housing 34 as the caster stem 38 rotates relative to housing 34.

A rotational force may be required to rotate the first race 62 relative to the second race 64. The rotational force may be influenced by the friction between the roller 66 and the first race 62 and second race 64. The distance between the first race 62 and second race 64 may influence the friction between the roller 66 and the first race 62 and second race 64. The amount of friction may be inversely proportional to the distance between first race 62 and second race 64.

The first bearing 60 may be considered to be above the ledge 41 of the body 40 when the distance between at least a portion of first bearing 60 and an end (e.g., end opposite flange 42) of caster stem 38 is less than the distance between the ledge 41 of body 40 and the end of caster stem. The first bearing 60 may be considered to be below the ledge 41 of the body 40 when the distance between at least a portion of first bearing 60 and the end (e.g., end opposite flange 42) of caster stem is greater than the distance between the ledge 41 of body 40 and the end of caster stem 38.

Caster 30 may include a second bearing 68 that allows rotation of the caster stem 38 relative to housing 34. Second bearing 68 may include a central opening to receive a portion of caster stem 38. Second bearing 68 may resist lateral and/or movement of caster stem 38 (e.g., as caster stem rotates relative to housing). Second bearing 68 may include a first race 70 (e.g., outer race), a second race 72, (e.g., inner race), and a bearing element or roller 74 between the first race 70 and second race 72. In some embodiments, second bearing 68 is a tapered roller bearing or a tapered needle bearing. In other embodiments, second bearing 68 is a race bearing, plain bearing, rolling bearing, slewing bearing, or angularly disposed bearing. At least one of first bearing 60 and second bearing 68 may be shielded or sealed. Second bearing 68 may have a larger diameter than first bearing 60.

First race 70 and second race 72 may define a receiving area for roller 74. Roller 74 may be a ball bearing or cylindrical element that rotates relative to at least one of first race 70 and second race 72. At least one of first race 70, second race 72 and roller 74 may rotate relative to the housing as the caster stem 38 rotates relative to housing 34. At least one of first race 70, second race 72 and roller 74 may be rotationally fixed relative to the housing 34 as the caster stem 38 rotates relative to housing 34.

At least one of first race 70 and second race 72 may be adjacent a surface (e.g., lower surface) of shelf 54. A gasket or O-ring may be positioned between second bearing 68 and shelf 54. At least one of first race 70 and second race 72 may be positioned adjacent or in contact with flange of caster stem 38. Second bearing 68 may be at least partially disposed in the space between the ridge 44 and the body 40 of the caster stem 38. Second bearing 68 may be positioned in second chamber 50. First bearing 60 may be positioned on a first side of opening 37 and second bearing may be positioned on a second side of opening 37 opposite the first side. First bearing 60 and second bearing 68 may be substantially aligned in a plane.

A rotational force may be required to rotate the first race 70 relative to the second race 72. The rotational force may be influenced by the friction between the roller 74 and the first race 70 and second race 72. The distance between the first race 70 and second race 72 may influence the friction between the roller 74 and the first race 70 and second race 72. The amount of friction may be inversely proportional to the distance between first race 70 and second race 72. The force required to rotate caster stem 38 relative to housing 34 may be a combination of the force required to rotate first bearing 60 and second bearing 68.

At least one of first bearing 60 and second bearing 68 may include a lubricant (e.g., grease or silicone) between first race and second race. Lubricant may affect the friction between roller, first race, and second race. First bearing lubricant may be different from second bearing lubricant. Lubricant may have a viscosity of about 0.5 $ft^2/s$, about 1 $ft^2/s$, about 5 $ft^2/s$, about 10 $ft^2/s$, about 20 $ft^2/s$, about 30 $ft^2/s$, about 50 $ft^2/s$, about 75 $ft^2/s$, about 100 $ft^2/s$, about 200 $ft^2/s$, about $ft^2/s$, about 400 $ft^2/s$, about 500 $ft^2/s$, about 750 $ft^2/s$, about or about 1,000 $ft^2/s$. Lubricant may be highly viscous.

A biasing element 78 may engage a surface of first bearing 60 to help provide the desired friction in at least one of first bearing 60 and second bearing 68. Biasing element 78 may be configured to exert a force on at least one of first bearing 60 and second bearing 68. Biasing element 78 may be manufactured from a resilient material (e.g., rubber). Biasing element 78 may be a spring or washer (e.g., Belleville spring washer, lock washer, coil spring, or coned disc spring). Biasing element 78 may include a first coned disc spring and a second coned disc spring. An outer portion of the first coned disc spring may contact an outer portion of the second coned disc spring. An inner portion of the first coned disc spring may contact an inner portion of the second coned disc spring. A first portion (e.g., outer portion) of the first coned disc spring and second coned disc spring may be in contact while a second portion (e.g., inner portion) of the first coned disc spring and second coned disc spring is spaced from each other. Biasing element 78 may have a frusto-conical shape.

A ratio of the diameter of biasing element 78 to diameter of caster stem 38 may be about 1.1:1 to about 4:1. Biasing element 78 may have provide a spring force of about 100 lb/in to about 500 lb/in, about 500 lb/in to about 1,000 lb/in, about 1,000 lb/in to about 2,500 lb/in, about 2,500 lb/in to about 5,000 lb/in, or about 5,000 lb/in to about 10,000 lb/in. Biasing element 78 may apply a spring load of about 50 pounds to about 1,000 pounds. Biasing element 78 may include a central opening to receive a portion of caster stem 38.

It may be desirable for caster 30 to include a means to adjust the friction in at least one of the first bearing 60 and second bearing 68. Increasing the friction may provide greater resistance to rotation of the caster stem 38 relative to the housing. This increased resistance may help reduce undesired rotation or flutter of the caster stem 38.

Caster 30 may include a locking element 76 coupled to caster stem 38. In some embodiments, locking element 76 is threadedly engaged with caster stem 38. In other embodiments, locking element 76 is engaged with caster stem 38 via press fit, fastener, magnet, or adhesive. Locking element 76 may be a nut that engages threads on the caster stem 38.

In some embodiments, biasing element 78 is positioned between locking element 76 and first bearing 60 or housing 34. In other embodiments, locking element 76 directly contacts first bearing 60. Locking element 76 and biasing element 78 may be in first chamber 48. Biasing element 78 may be positioned between locking element 76 and first bearing 60. Biasing element 78 may be positioned between first bearing 60 and shelf 54 of housing 34. Biasing element 78 may be positioned between shelf 54 and second bearing 68. Biasing element 78 may be positioned between second bearing 68 and flange 42 of caster stem 38. Caster 30 may include more than one biasing element 78. Caster 30 may include one, two, three, or four biasing elements.

Adjustment of the locking element 76 relative to caster stem 38 may reduce the distance between first bearing 60 and second bearing 68. This reduction in distance may increase the force exerted (e.g., by biasing element 78, locking element 76, housing 34 or bushing 56) on first bearing 60, thereby increasing friction in the first bearing and increasing resistance to rotation by the first bearing 60. Adjustment of locking element 76 may compress second bearing 68 between flange 42 and shelf 54. Compressing second bearing 68 may increase the force exerted (e.g., by shelf 54, flange 42, or biasing element 78) on second bearing 68, thereby increasing friction in second bearing and increasing resistance to rotation by second bearing 68.

At least one of first bearing 60 and second bearing 68 may move (e.g., axially) relative to caster stem 38 as locking element 76 is adjusted. First bearing 60 or second bearing 68 may move, or combine to move, a distance less than or equal to the distance by which biasing element 78 compresses when locking element 76 is adjusted.

Adjusting locking element 76 relative to caster stem 38 may compress biasing element 78. Biasing element 78 may be selected such that the force exerted by the biasing element 78 on first bearing 60 is less than the force exerted by locking element 76 on biasing element 78.

It may be desirable to prevent locking element 76 from loosening during operation of vehicle 20 or rotation of caster stem 38. Locking element 76 may be at least temporarily rotationally fixed relative to caster stem 38 such that locking element 76 rotates in concert with caster stem 38. Locking element 76 may be transitionable from an unlocked condition to a locked condition. Locking element 76 may be rotatable relative to the caster stem 38 in the unlocked condition and rotationally fixed relative to the caster stem 38 in the locked condition. Locking element 76 may reduce or prevent movement of caster stem 38 along axis $A_3$ while allowing rotation of caster stem about axis $A_3$.

Locking element 76 may be transitioned from the unlocked condition to the locked condition by rotating locking element 76 with a locking torque force. The locking torque force may be about 1 foot pound ("ft-lb"), about 2 ft-lb, about 3 ft-lb, about 4 ft-lb, about 5 ft-lb, about 10 ft-lb, about 15 ft-lb, about 20 ft-lb, about 25 ft-lb, about 30 ft-lb, about 35 ft-lb, about 40 ft-lb, about 45 ft-lb, about 50 ft-lb, about 60 ft-lb, about 70 ft-lb, about 80 ft-lb, about 90 ft-lb, about 100 ft-lb, about to about 5 ft-lb, about 5 to about 10 ft-lb, about 10 to about 20 ft-lb, about 20 to about 30 ft-lb, about 30 to about 40 ft-lb, about 40 to about 50 ft-lb, about 50 to about 100 ft-lb, more than 1 ft-lb, less than 50 ft-lb, less than 100 ft-lb, less than 200 ft-lb, or greater than 100 ft-lb.

Applying the locking torque force to move locking element 76 to the locked configuration may exert substantial force on biasing element 78, first bearing 60, or second bearing 68. This substantial force may result in excess resistance to rotation by the first bearing 60 or second bearing 68. It may be desirable to limit the force exerted on first bearing 60 and second bearing 68 while allowing the locking torque force to be applied to locking element 76.

Caster 30 may include a spacer or collar 80 that sets a minimum distance between locking element 76 and shelf 54. Collar 80 may have a cylindrical shape. Collar 80 may include an opening to receive a portion of caster stem 38. A first (e.g., lower) portion of collar 80 may engage a ledge 41 of caster stem 38 and locking element 76 engages a second (e.g., upper) portion of collar when the first bearing 60 is above the ledge 41. Collar 80 may be omitted when first bearing 60 is below the ledge 41. Locking element 76 may engage ledge 41 when first bearing 60 is below ledge 41.

Collar 80 may be manufactured from a rigid material (e.g., steel, aluminum, iron, or hard plastic) such that the collar 80 resists deformation as the locking torque force is applied to locking element 76. Collar 80 may have a height greater than a height of first bearing 60. A shorter collar may help provide a caster system with a greater rotation resistance compared to a taller collar. The height of collar 80 and spring rate of biasing element 78 may be selected to provide a desired rotation resistance. At least one of collar 80, locking element 76, biasing element 78, and collar 80 maybe be detachably coupled to caster stem 38. At least one of collar 80 and biasing element 78 may allow locking element 76 to be fully torqued without detrimentally effecting resistance to rotation. Collar 80 may allow a locking torque of about 10 ft-lbs to about 60 ft-lbs to be applied. Collar 80 may allow a locking torque to be applied to locking element 76 such that rotating caster stem 38 relative to housing 34 requires a rotation force of about 1 ft-lb to about 10 ft-lbs. Locking element 76 may contact a portion of biasing element 78 before locking element 76 contacts collar 80. Locking element 76 may move biasing element 78 from a relaxed configuration to a compressed configuration.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

I claim:

1. A caster wheel assembly for reducing caster flutter comprising:
   a caster housing having a chamber defined by a radial sidewall;
   a caster stem disposed within the chamber and rotatable relative to the radial sidewall;
   a bearing radially disposed about the caster stem; and
   a biasing element disposed in the chamber between the caster stem and the radial sidewall, the biasing element configured to exert an axial force that is axially aligned with the caster stem on the bearing to increase friction in the bearing.

2. The caster wheel assembly of claim 1, wherein the caster housing includes a radial shelf disposed about the caster stem and wherein the caster wheel assembly further comprises a bushing disposed between the radial shelf and the caster stem.

3. The caster wheel assembly of claim 2, wherein the bearing is disposed between the biasing element and the radial shelf.

4. The caster wheel assembly of claim 2, wherein the caster housing includes a chamber shaft defined by the radial shelf and wherein the bushing comprises a bushing flange extending radially outwardly from the chamber shaft and wherein the bushing flange is disposed between the biasing element and the radial shelf.

5. The caster wheel assembly of claim 4, wherein the bushing is rotationally fixed to the radial sidewall and is configured and dimensioned to reduce caster stem wobble as the caster stem rotates withing the chamber shaft.

6. The caster wheel assembly of claim 4, wherein the caster stem includes a stem body and a stem flange that radially extends from the stem body beyond an outer diameter of the chamber shaft.

7. The caster wheel assembly of claim 2, wherein the caster stem includes a stem body and a stem flange that radially extends from the stem body and wherein the caster wheel assembly further comprises a tapered bearing disposed between the radial shelf and the stem flange.

8. The caster wheel assembly of claim 2, wherein the caster stem includes a stem body and a stem flange that radially extends from the stem body and wherein the caster wheel assembly further comprises a rolling bearing disposed between the radial shelf and the stem flange.

9. The caster wheel assembly of claim 1, further comprising:
   a locking element threadedly coupled to the caster stem; and
   a collar disposed along the caster stem to cooperate with the locking element to restrict rotation of the locking element relative to the caster stem in a locked configuration.

10. The caster wheel assembly of claim 9, wherein the collar is configured to resist deformation from a torque force of about 60 ft-lbs applied to the locking element.

11. The caster wheel assembly of claim 9, wherein the caster wheel assembly is configured to achieve the locked configuration when a torque force of up to 60 ft-lbs is applied to the locking element.

12. The caster wheel assembly of claim 9, wherein the collar is configured to resist deformation from a torque force of about 10 ft-lbs to about 60 ft-lbs applied to the locking element.

13. The caster wheel assembly of claim 9, wherein the caster stem includes an intermediate ledge and the collar is configured to engage the intermediate ledge and the locking element in the locked configuration.

14. The caster wheel assembly of claim 9, wherein the caster stem includes a neck portion and a body portion, wherein the neck portion has a smaller outer diameter than the body portion and wherein the collar is configured to engage the neck portion such that an outer surface of the collar is substantially aligned with an outer surface of the body portion.

15. The caster wheel assembly of claim 9, wherein the collar defines a minimum distance between the locking element and a ledge of the caster stem.

16. The caster wheel assembly of claim 9, wherein a ledge of the caster stem is the collar.

17. The caster wheel assembly of claim 9, wherein in the locked configuration, the locking element prevents movement of the caster stem along a longitudinal axis of the caster stem while the caster stem is rotatable about a longitudinal axis.

18. The caster wheel assembly of claim 9, wherein the locking element is rotationally fixed relative to the caster stem in the locked configuration.

19. The caster wheel assembly of claim 9, wherein a rotation force of about 1 ft-lb to about 10 ft-lbs is required to rotate the caster stem relative to the radial sidewall in the locked configuration.

20. The caster wheel assembly of claim 1, wherein the biasing element is configured to exert a spring force of about 100 lb/in to about 500 lb/in.

21. The caster wheel assembly of claim 1, wherein the bearing includes a roller having a rotational axis that is substantially perpendicular to an axis about which the caster stem is configured to rotate.

22. The caster wheel assembly of claim 1, wherein the bearing includes a roller having a rotational axis that is angled relative to an axis about which the caster stem is configured to rotate.

23. The caster wheel assembly of claim 1, wherein the bearing is a ball bearing.

24. The caster wheel assembly of claim 1, wherein the bearing is a roller bearing.

25. The caster wheel assembly of claim 1, wherein the increased friction in the bearing promotes resistance to rotation of the caster stem relative to the caster housing.

26. The caster wheel assembly of claim 1, wherein the biasing element does not exert a force on the radial sidewall.

* * * * *